United States Patent [19]

Ammann et al.

[11] 4,036,636

[45] * July 19, 1977

[54] PYROMETALLURGICAL PROCESS FOR SMELTING NICKEL AND NICKEL-COPPER CONCENTRATES INCLUDING SLAG TREATMENT

[75] Inventors: Paul R. Ammann, Boxford; Jonathan J. Kim, Chelmsford, both of Mass.

[73] Assignee: Kennecott Copper Corporation, New York, N.Y.

[*] Notice: The portion of the term of this patent subsequent to Dec. 31, 1991, has been disclaimed.

[21] Appl. No.: 642,896

[22] Filed: Dec. 22, 1975

[51] Int. Cl.² .................................................... C22B 15/00
[52] U.S. Cl. .................................... 75/74; 75/24; 75/63; 75/82
[58] Field of Search .................. 75/24, 63, 82, 72–76

[56] References Cited

U.S. PATENT DOCUMENTS

| 1,599,424 | 9/1926 | Lellep | 75/82 |
|---|---|---|---|
| 3,754,891 | 8/1973 | Bryk et al. | 75/74 |
| 3,857,700 | 12/1974 | Ammann et al. | 75/63 |
| 3,861,660 | 1/1975 | Ammann et al. | 75/24 |
| 3,890,139 | 6/1975 | Suzuki et al. | 75/74 |

*Primary Examiner* — M. J. Andrews
*Attorney, Agent, or Firm* — John L. Sniado; Anthony M. Lorusso

[57] ABSTRACT

Process for recovering nickel and nickel-copper from molten smelter-type slags or other highly oxidized sources of nickel and nickel-copper containing 7 to 30 percent by weight of magnetite ($Fe_3O_4$). The magnetite in the slag is reduced with carbonaceous materials or other solid reductants such as sulfides, metals or carbides. While the slag is mixed with a fluid cooled, metal-bladed mechanical stirrer, the reductant is reacted with the slag. As a result of stirring the reductant into the slag, the rate of magnetite reduction is highly accelerated. With the reduction, the nickel or nickel-copper (as well as cobalt, if present) separates into a phase as either immiscible metal, a sulfide, or a nickel-copper-iron-sulfide matte, depending upon the initial composition of the slag.

17 Claims, 5 Drawing Figures

PYROMETALLURGICAL PROCESS FOR SMELTING NICKEL AND NICKEL-COPPER CONCENTRATES INCLUDING SLAG TREATMENT

CROSS REFERENCE TO A RELATED APPLICATION

Reference is specifically made to our prior U.S. Pat. No. 3,857,700 issued Dec. 31, 1974 entitled Pyrometallurgical Recovery of Copper Values from Converter Slags, the teachings of which are incorporated herein by reference.

BACKGROUND OF THE INVENTION

As is stated above, the present application is related to the invention disclosed in a prior U.S. Pat. No. 3,857,700. In that patent, a process is disclosed for reducing highly oxidized copper converter slags to recover copper values contained therein. The process disclosed in that patent includes the step of pumping a solid reductant into the slags with a fluid cooled metal bladed mechanical stirrer. The stirrer enables reductants which are lighter than the slag to be maintained in contact with the slags for a sufficient amount of time to react with it and reduce the slags. With the reduction, metal values separate from the slag into a matte phase from which they are easily recoverable.

The present disclosure is directed to treating slags containing nickel or copper-nickel (or either of the foregoing along with cobalt) to enable the nickel or nickel-copper and any cobalt values to be recovered.

The smelting of nickel concentrates are described in "The Winning of Nickel" by Paul Queneau, D. Van Nostrand and Company, Princeton, N.J., 1967, the teachings of which are incorporated herein by reference.

One conventional nickel concentrate smelter is Inco's Plant at Thompson, Mannitoba and is described on pages 263-267 in "The Winning of Nickel". Typically, nickel sulfide concentrates contain 7.5 percent nickel, 0.36 percent copper, 41 percent iron and the remainder is sulfur and silica.

In conventional practice, this concentrate is partially oxidized in a fluid-bed roaster, and the material is then smelted in an electric arc furnace. At Inco, an 18,000 KVA submerged arc electric furnace with six in-line electrodes is employed for smelting. In the smelting furnace, concentrate is smelted to produce a matte (see FIG. 1) which is then transferred to a converter in which the iron and most of the sulfur is removed. The silica in the feed to the electric furnace goes into the slag phase and the iron oxide slag which is generated in the matte converting operation is returned to the electric furnace to recover the metal values (nickel and copper). In the flowsheet illustrated by FIG. 1, the overall nickel recovery is 97.7 percent and the copper is approximately 97 percent. The nickel-copper matte which is produced in the converting operation is cooled and treated hydrometallurgically to recover the copper-nickel values.

One of the important considerations in this flow sheet shown in FIG. 1 is the return of the converter slag to the electric furnace. First, it contains large concentrations of magnetite and second, high concentration of nickel and copper which require its return to recover these metals. In addition, magnetite is charged to the electric furnace with the roaster calcine and the two sources of magnetite, both from the fluo-solids roaster and the converter slag return, tend to form solid refractory materials in the electric furnace which reduce the rate of smelting capacity in the furnace and cause operational difficulties.

In accordance with the present invention, it has been discovered that it is possible to improve the overall economics of recovering metals by the process illustrated in the flow sheet of FIG. 1. The use of the stirred electric furnace in accordance with the present invention for the process of the type shown in FIG. 1 is shown in FIG. 2. By utilizing the stirred electric furnace to blend a reductant into the slags, it is not necessary to return the converter slags to the smelting furnace. By following the present invention, the overall nickel recovery will increase (from 97.7 to 98.3 percent) and approximately the same copper recovery will be achieved. However, by following the present invention it is possible to increase the smelting capacity of the electric furnace by about 15 percent. This increase in capacity is a direct result of not returning the converter slags to the smelting furnace. Of course, many of the problems associated with the return of the high oxygen converter slag (magnetite) will be obviated by this process flow.

A most significant advantage of the process of the present invention is that because converter slags are not returned to the smelting furnace, less air (oxygen) enters the smelting furnace. It should be apparent that when launders are open to return slag, air is introduced into the smelting furnace. The introduction of air into the smelting furnace is undesirable for many reasons. These reasons include more volume in the off gas from the furnace to be processed and more dilute sulfur dioxide in these off gases which make their treatment more expensive.

In treating the converter slag which contains nominally 1.1 percent nickel and 0.3 percent copper in the stirred-electric furnace, a high-grade matte containing 30 percent nickel and 7 percent copper is produced; it can be returned directly to the converter for upgrading to the matte product. The total slag discharge by this modified process is approximately the same as that for the conventional Inco flow sheet.

In addition to the use of the stirred-electric furnace for treatment of the converter slag, mechanical stirrers may be installed in the electric smelting furnace with the following advantages.
 a. increased smelting rate of concentrates by the dispersion of energy throughout the bath.
 b. production of homogeneous well-mixed slags which minimize the formation of solidified refractorty materials and enhance disengagement of matte from the slag.

Of course, it should be appreciated that the present invention has utility merely beyond those processes which employ a conventional nickel concentrate smelter. For example, the present invention can be utilized to treat concentrates which are high in copper and relatively low in nickel. The present invention can also be used to optimize flash smelting of nickel-copper concentrates. These details, however, appear below.

The following publications fairly represent the prior art.

An article is one by Pimenov, L. I. and Zyezev, L. I. entitled "Reduction Electrosmelting of Converter Slags from Nickel Production", Tsvetn. Metal. 38(1) (1965), pp. 34–36. In that process, converter slags from a nickel refinery are treated in a round, three electrode electric furnace. Converter type slags containing 0.37 percent Co, 1.03 percent Ni, 49 percent Fe, 29 percent $SiO_2$ were charged into the furnace. After treatment, the slag contained 0.1 percent Co and 0.05 percent Ni. The matte product contained 1.6 percent Co and 5.6 percent Ni, 64 percent Fe and 24.6 percent S. Yields were 72 percent Co and 93 percent Ni. The distribution between phases were:

$$D_{Co} = 1.6\%/0.097 = 16.5$$
$$D_{Ni} = 5.6/0.05 = 112$$

The slag reaction time was seven hours, the energy consumption 483 kw-hr/ton.

Another patent representative of the state of the art is U.S. Pat. No. 3,542,352 by Themelis et al., entitled "Apparatus for the Continuous Smelting and Converting of Copper Concentrates to Metallic Copper." In the process disclosed in this patent, as part of continuous copper smelter, there is a slag cleaning section of the furnace which is an unbaffled open vessel. In this process, there is countercurrent flow of matte and slag.

Paper No. A74-16 presented before AIME entitled New Developments in Outokumpu Flash Smelting Method by S. U. Harkki et al. U.S. Pat. No. 3,754,891 entitled Method of Producing Iron-Poor Nickel Sulphide Matte from Sulphidic Nickel Concentrates in Suspension Smelting Thereof by Bryk et al. In recent years the trend of development in the flash smelting process has been toward high-grade matte production and as a consequence, converting has been reduced considerably. Copper matte containing about 80 percent copper and nickel matte containing more than 73 percent nickel and copper with less than 3 percent iron can be produced continuously by flash smelting without essentially increasing the copper nickel contents of the slag. This is possible by making the conditions in the lower part of the shaft slightly reducing. For further details of the foregoing see U.S. Pat. No. 3,754,891.

An article by Bryk, P. et al., "Flash Smelting of Copper Concentrates", AIME, February 1958, discloses a process wherein copper in flash smelter slags is recovered by holding the slag in an electric furnace for several hours. Lime and coke are added, and copper settles into a matte. The furnace is quiescent and there is no agitation to enhance the extraction rate. Copper is reduced to 0.2 to 0.6 percent by controlling the reduction of FeO in the slag. The energy consumption is 130 kw hr/ton slag.

It is a fact that the method most commonly used for slag cleaning is treatment in electric furnace and slag flotation. This does not involve a reduction scheme but merely employs physical separation of a matte from a slag. The selection of the cleaning process for copper depends upon local circumstance, but the electric furnace treatment is, however, the best prior art method for the efficient economical recovery of nickel.

Recirculation of converter slags to electric furnaces causes certain disadvantages. Impurities such as lead, nickel and antimony are reduced together with copper, making it more difficult to process the impure material. Another disadvantage is the risk of magnetite-build up on the bottom of the electric furnace due to the high magnetite content of the converter slag. In shoft, using electric furnaces to treat converter slags has many disadvantages which are overcome by treatment in accordance with the present invention.

In short, in the most widely used prior art processes, nickel or nickel-copper is recovered from slags by either returning the slag to the reverberatory furnace to allow the nickel or nickel-copper to settle; or cooling, grinding and floating the slag; or settling the nickel or nickel-copper in an electric furnace. Each of the foregoing methods suffers from one or more deficiencies which are significantly reduced in the process of the present invention.

SUMMARY OF THE INVENTION

The invention relates to a novel arrangement of smelting and slag cleaning steps for overall efficient nickel smelting. The recovery of nickel or nickel-copper from slags containing significant amounts of magnetite is accomplished in accordance with the present invention by mixing a solid reductant which may be Fe, $CaC_2$, FeSi, sulfides ($FeS_2$, $CuFeS_2$) coke, coal, etc. into the slag with a fluid cooled, metal-bladed mechanical stirrer to reduce the magnetite and nickel oxide-copper oxide content of the slag.

The foregoing enables a more economic means for recovering nickel or nickel-copper from oxidized slags and permits an increase in productivity in the smelter.

Accordingly, it is an object of the present invention to provide an improved process for smelting nickel concentrates and treating the slag to recover nickel or nickel-copper values and cobalt from slags containing significant amounts of magnetite.

Another object of the invention is to provide a process for recovering nickel or nickel-copper and any cobalt values from converter slags in which the converter slag is reduced and thereafter mixed with an iron-sulfide matte to extract the nickel or nickel-copper and any cobalt values in the slag into the matte.

It is yet another object of the present invention to provide a process for the recovery of metal values from slag wherein slag is treated in a single or multistage reactor which is mixed by a fluid cooled, metal-bladed mechanical stirrer to increase the amount of contact between the reductants and the slag.

Another object of the present invention is to improve the overall metals recovery and to reduce the potential for operating difficulties in processes wherein nickel is produced.

A further object of the present invention is to increase the capacity for smelting nickel in an electric furnace by eliminating the need to return the converter slag to the smelting furnace.

DESCRIPTION OF THE PREFERRED EMBODIMENTS

At the outset, the invention is described in its broadest overall aspects with a more detailed description following. In accordance with the present invention, a mechanically stirred furance is employed to enable a solid reductant to be used in conjunction with a conventional smelting furnance (such as a Flash Furnace or Noranda Reactor) to process nickel (and copper, cobalt sulfide concentrates. The mechanically-stirred furnace is employed to treat all of the smelter slags. It allows:

a. increased metals recovery (lower metals losses);
b. simplified processing; and,
c. an economic process to treat sulfide concentrates which even have a Cu/Ni ratio greater than 1.

Three applications of the nickel smelting slag cleaning process are described. They include: (1) conventional nickel sulfide concentrates, (2) a potential but, at present, not commercialized copper rich-nickel concentrate, and (3) the use of the stirred electric furnace with a conventional flash smelting furnace, to achieve a unique set of operating conditions.

Nickel and copper are present in highly oxidized slag in two forms: (1) entrained metal and sulfides, and (2) soluble (oxidized) nickel and copper.

Figure 1:
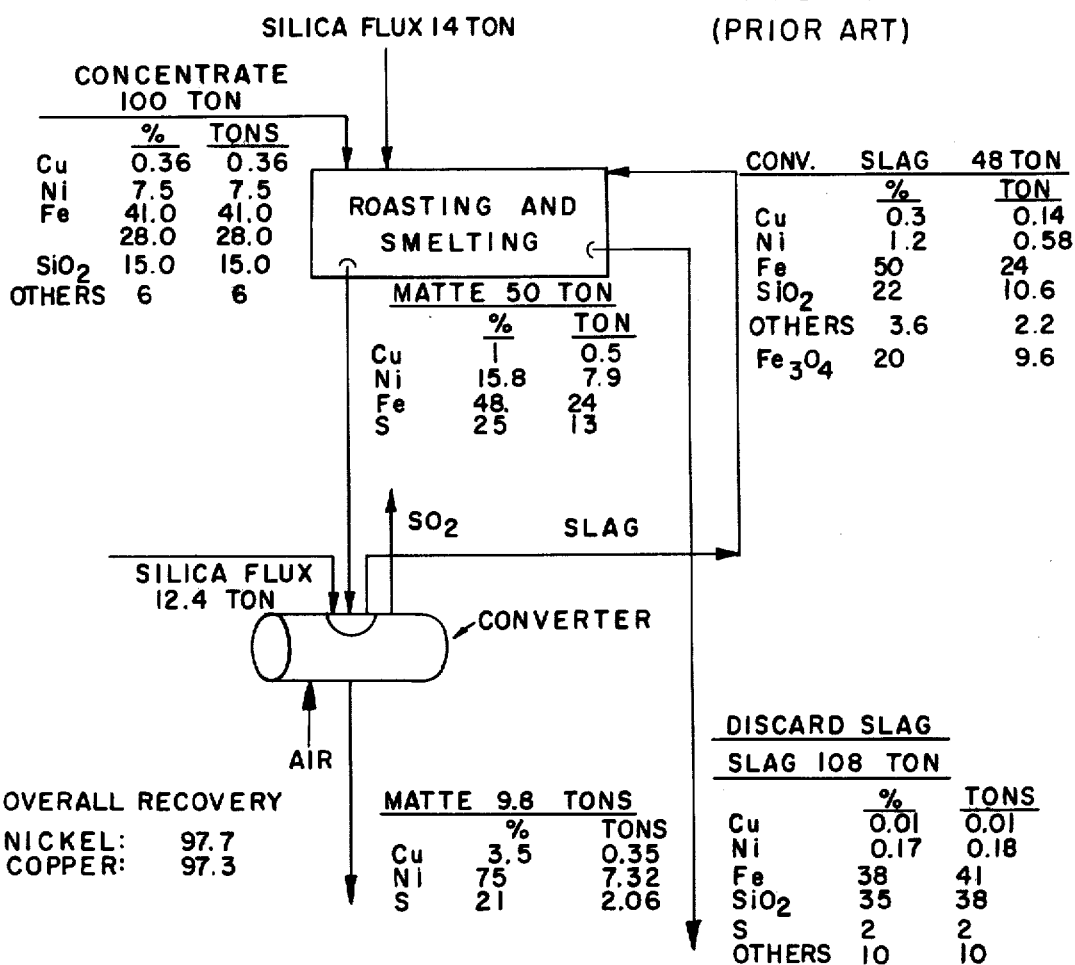
FIG. 1 is a flow sheet showing a conventional process for smelting nickel (copper) sulfide concentrates.

With prior art processes such as is shown in FIG. 1, the products (non-slag or nickel phase or nickel/copper phase) typically contain 50 – 70% nickel and/or 3 to 5% copper while the slag phase contains 0.05 to 3.0% nickel and 0.3 to 1.5% copper. In the present process it is possible to clean slags to 0.1% concentration of nickel and 0.01% concentration of copper while producing a matte which is comparable to mattes produced by prior art processes.

The soluble nickel and copper content is related thermodynamically to the oxygen potential of the slag. To lower the nickel or copper to an acceptably low level of 0.2 weight percent or less, the slag must be chemically reduced. In the present invention, this is accomplished by reduction with a carbonaceous material (coal, coke, and petroleum coke) as well as metallic reductants, carbides and sulfides.

Since such materials "float" on molten slag, the reduction effectiveness is poor unless it is forced into the molten material. Thus, it is a further aspect of this invention that the reductant material is worked into the molten slag by a cooled, metal-bladed mechanical stirrer.

If the reduction is conducted in a single furnace, nickel or nickel-copper can be extracted; however, the product grade may be low to obtain an acceptably low level of metal values in the discarded slag. Preferably, the reactor system should be staged to achieve a high recovery of nickel or nickel-copper and a high grade product.

The pyrometallurgical recovery of nickel or nickel-copper from molten, high magnetite slag is based upon chemical reduction. The solubility of nickel and copper is decreased as the $Fe_3O_4$ (oxygen potential) is reduced to less than 5 weight percent, that is, the iron saturation point of a slag.

High magnetite slags are complex with respect to contained nickel and copper which is a combination of entrained metal sulfide and dissolved nickel and copper. In conventional converter slags, the nickel and copper content and composition varies throughout the converter cycle, and entrained nickel and copper is a function of converter operating practice. Slags from converters, flash furnaces and Noranda furnaces vary in composition of iron, magnetite, silica, nickel and copper. Typical values are presented in Table 1 below. In general, the silica content will vary from 20 to 30 percent and magnetite from 15 to 25 percent. The iron content will vary from 36 to 49 percent.

TABLE I

COMPOSITIONS OF TYPICAL NICKEL SMELTING SLAGS IN WEIGHT PERCENT

| Type of Slag | Converter | Flash Furnace | Noranda* Furnace |
|---|---|---|---|
| Nickel | 1 – 4 | 1 – 2 | 1 – 4 |
| Copper | 1 – 5 | 1 – 1.5 | 12 |
| Silica | 20 – 29 | 29 – 30 | 22 – 24 |
| Iron-Total | 46 – 49 | 44 – 46 | 36 |
| Magnetite | 20 – 25 | 10 – 13 | 20 – 25 |
| Sulfur | 1 | 1 | 1 |

*Assumed for treating a concentrate containing 1-3% Ni

Nickel and copper solubility in slag is related to the oxygen potential of the slag, as represented by Equation 1 and 2.

$$Ni\,(l) + Fe_2O_3(l) = NiO(l) + 2\,FeO(l) \qquad (1)$$
$$2\,Cu\,(l) + Fe_2O_3(l) = Cu_2O(l) + 2\,FeO\,(l) \qquad (2)$$

The equilibrium for the reaction is defined as $$K_{eq} = A_{NiO}/A_{Ni} \cdot A_{FeO}^2/A_{Fe_2O_3}$$
$$K_{eq} = A_{Cu_2O}/A_{Cu}^2 \cdot A_{FeO}^2/A_{Fe_2O_3}$$

Thus, at any temperature, the activity of nickel or copper in the slag (NiO or $Cu_2O$) is determined by the activity of nickel or copper in the insoluble nickel or copper matte and the activities of FeO and $Fe_2O_3$ in the slag. The latter are in turn a function of the silica content of the slag. The activity of $Fe_2O_3$ is related by $$Fe_2O_{3(l)} = 2FeO_{(l)} + \tfrac{1}{2}O_2 \qquad (3)$$
$$2Fe_2O_3 = Fe_3O_4 + FeO \qquad (4)$$
$$C_{Cu} = K_{Cu}X_{Cu}^a \cdot C_{Fe_3O_4}^b \quad \text{or} \quad C_{Ni} = K_{Ni}X_{Ni}^a C_{Fe_3O_4}^b \qquad (5)$$

Thus, the content of dissolved nickel or copper in the slag is related to the concentration of magnetite in the slag ($C_{Fe_3O_4}$) and nickel or copper in the matte ($X_{Me}$). The high concentrations of soluble nickel or copper in high magnetite slags are a result of the oxygen potential and the matte grade. Correspondingly, it is necessary to reduce the oxygen potential through chemical reduction, and the matte grade in order to remove nickel or copper from molten converter slag.

The magnetite and nickel oxide or copper oxide can be reduced either by carbon (e.g., coal or coke) or labile sulfur from pyrite or copper concentrate. The equilibrium product compositions have been computed for carbonaceous reduction and pyrite or concentrate reduction.

Carbon will reduce slag magnetite producing either carbon monoxide or carbon dioxide, according to the following equations:

$$Fe_3O_{4(l)} + C_{(s)} = 3\,FeO_{(l)} + CO_{(g)} \qquad (6)$$
$$Fe_3O_{4(l)} + \tfrac{1}{2}C_{(s)} = 3FeO_{(l)} + \tfrac{1}{2}CO_{2(g)} \qquad (7)$$

Note also other reactions:

$$Fe + Fe_3O_4 = 4FeO \qquad (7a)$$
$$CaC_2 + 3Fe_3O_4 = 9FeO + 2CO + CaO \qquad (7b)$$
$$FeSi + 3Fe_3O_4 = 10FeO + SiO_2 \qquad (7C)$$

If the product gases are in equilibrium with the slag, the equilibrium composition can be predicted by Equation 8.

$$Fe_3O_4 + CO = 3FeO + CO_2 \quad (8)$$

The ratio of $CO_2$ to $CO$ can be estimated from the equilibrium constant and the activities of $Fe_3O_4$ and FeO, respectively, according to:

$$P_{CO_2}/P_{CO} = K_8[a_{Fe_3O_4}/{}^3 FeO] \quad (9)$$

Depending upon the concentration, the activity of magnetite may vary from unity (saturation) to 0.1 (i.e., approximately 10 weight percent in slag). The activity of FeO will vary correspondingly from 0.6 to 0.4. The ratio of $CO_2$ to $CO$ has been calculated for a slag containing 25 weight percent $SiO_2$ and 10 to 30 weight percent $Fe_3O_4$ and is presented below in Table II.

TABLE II

ESTIMATED EQUILIBRIUM RATIO OF $CO_2$/CO IN REDUCTION

| $Fe_3O_4$(wt. %) | $\alpha Fe_3O_4$ | $\alpha FeO$ | $\dfrac{Fe_3O_4}{a^3_{FeO}}$ | 1127° C | [$pCO_2/PCO$] 1227° C | 1327° C |
|---|---|---|---|---|---|---|
| 30 | 1.0 | 0.4 | 15.6 | 122 | 184 | 272 |
| 20 | 0.5 | 0.47 | 4.8 | 37.5 | 56.6 | 84 |
| 15 | 0.2 | 0.55 | 1.2 | 9.4 | 14.2 | 20.9 |
| 10 | 0.1 | 0.60 | 0.46 | 3.6 | 5.4 | 8.0 |

These calculations indicate that CO is the predominant gas product to extract nickel out from slag or to reach the iron-saturation point of slag. It is assumed in the calculation that there is no solid carbon in the system — (which in fact there would be — to reduce $CO_2$ to CO).

The energy required for the carbothermic reduction of slag is a function of $CO_2$ produced.

The primary criterion for a pyrometallurgical slag treatment process is high recovery of metal values; that is, the cleaned slag should contain less that 0.1 weight percent nickel and 0.3 weight percent copper. It is also desirable to produce a high grade product or phase containing nickel or nickel-copper.

In a single furnace, it is theoretically possible to achieve a low nickel and copper slag product, provided the magnetite is reduced to less than 5 weight percent. To allow for losses by entrainment, it is preferable to produce a matte containing less than 20 percent nickel or copper.

It is possible, however, to achieve high recoveries while producing a high percent nickel or nickel-copper containing product or phase (greater than 40 weight percent nickel and 30 percent copper) in a multistaged furnace-reactor system where slag flows sequentially through two or more furnaces and then is removed from the system. In such a multistage system, pyrite, or copper concentrate, is added to the final stage, and is moved counter to the slag being enriched in nickel and copper.

Figure 3:
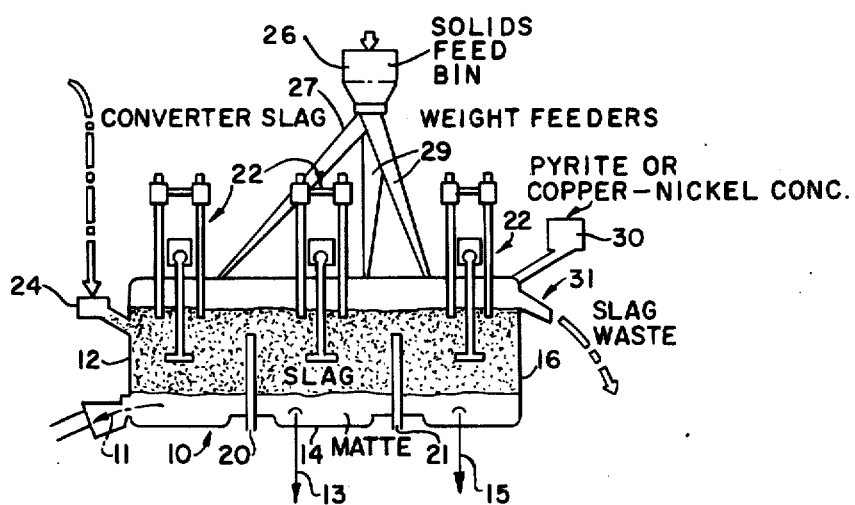
FIG. 3 is a more detailed view of the reduction circuit 9 of FIG. 2.
Figure 2:
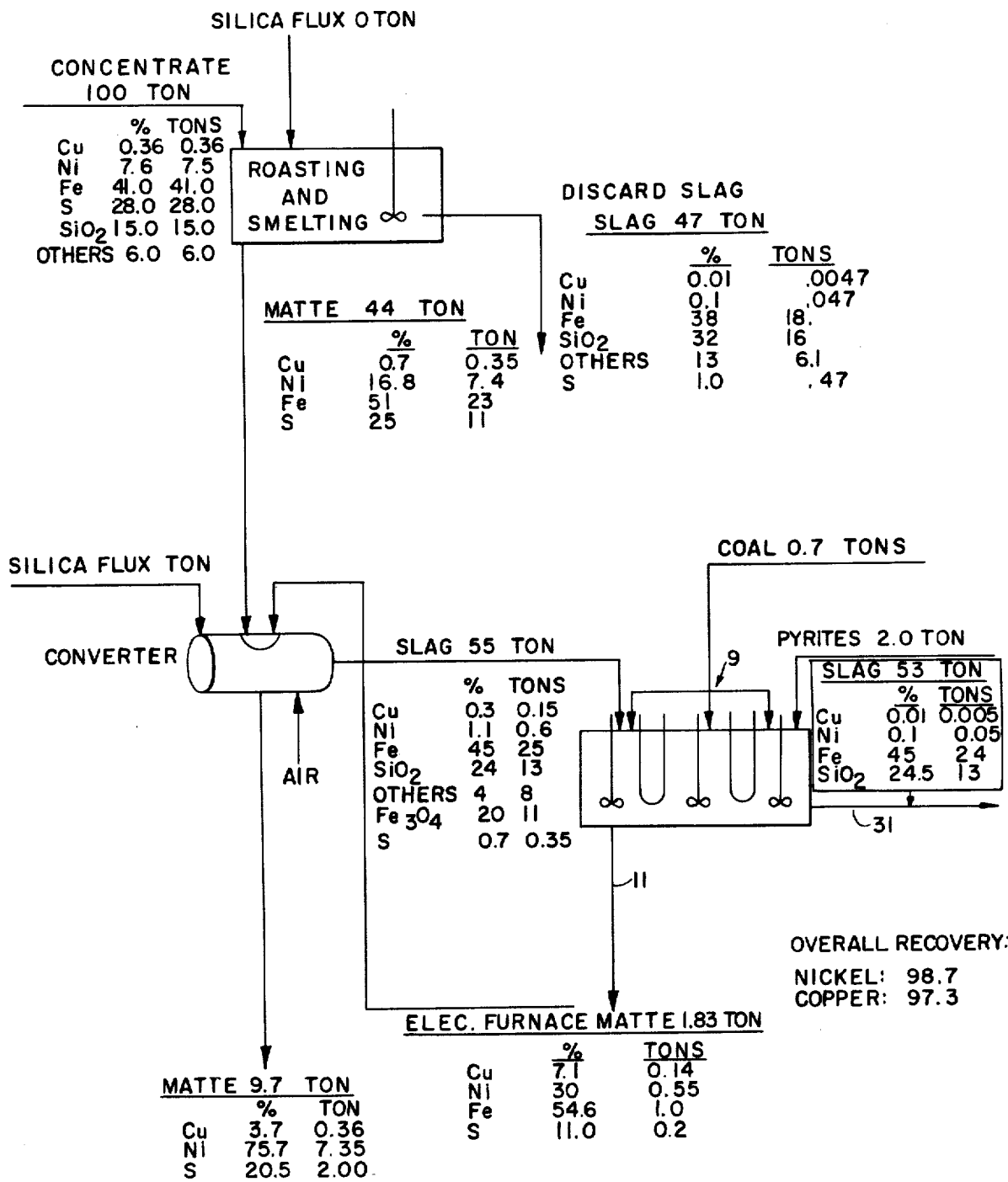
FIG. 2 is a flow sheet showing the conventional nickel (copper) sulfide concentrate smelting flow sheet of FIG. 1 with a stirred electric furnace in accordance with the present invention.

FIGS. 2 and 3 are provided to show how a conventional process flow sheet for smelting nickel and copper sulfide concentrate (see FIG. 1) is modified in accordance with the present invention. In accordance with the process of the present invention, as is shown in an overall sense in FIG. 2, the slag which is separated from the matte is introduced into a reduction circuit 9, which is shown in greater detail in FIG. 3. In the embodiment of the invention shown in FIGS. 2 and 3 the slag and a matte may contact each other in a countercurrent manner. However, countercurrent contact of slag and matte is not essential. Sequential contact of slag with: first, high grade matte, second, low grade matte, is important.

To accomplish such contact, a multistage reactor 10 is used. Although three reactors 12, 14 and 16 are shown in FIG. 3, as is apparent, two reactors can be utilized, or, indeed, more than three reactors can be utilized. Reactors 12, 14 and 16 are connected in series. It is preferable to stir the contents of the reactor with a stirrer assembly 22. Stirrer assembly 22 may be a fluid cooled mechanical stirrer having metal blades as is disclosed in U.S. Pat. No. 3,861,660 entitled "Pyrometallurgical System with Fluid Cooled Stirrer," by Paul R. Ammann et al., the teachings of which are incorporated herein by reference. The preferred coolant for the stirrer is a heat transfer fluid (oil) sold by Dow Chemical Company under their trademark "Dow Therm". Of course other coolants such as water could be used.

Converter slag is introduced into a slag treatment reactor 10 by being poured into a launder 24 located on reactor 12. The reductant in reactor 10, such as coal and coke, are added to reactor 10 by means of a feed bin 26 which has conveyors 27, 28 and 29 which distribute materials equally to reactors 12, 14 and 16. A hopper 30 is also provided in order to introduce iron pyrites or copper concentrate or copper-nickel concentrate into reactor 16. The three slag treatment reactors 12, 14 and 16 connected in series were determined to provide high nickel and copper yields and overall process flexibility.

The slag treatment product, nickel or nickel-copper phase, is drawn off separately from the slag.

Reduction can be effected with any known reducing agent such as carbon containing materials or iron, it being preferred to employ carbon containing materials since they are relatively inexpensive. Of course, economics may differ by location or country. It is essential, however, that the slag be admixed with the reductant to reduce $Fe_3O_4$. For a 100 ton converter slag feed, such as the one described in FIG. 2, 2.0 tons of coal with a carbon content of 1.6 tons may be used.

In short, the process of the present invention includes mixing a reductant into the slag to reduce it in order to extract the nickel and nickel-copper values therefrom as nickel, copper nickel sulfide, copper sulfide or nickel-copper-sulfide matte. Any cobalt present would also be extracted into the matte. Reduction and extraction can be accomplished at any temperature above the slag melting point (1050° C), however, treatment at 1200°-1350° C is preferred.

Theoretically, the concentration of nickel and copper in slag can be decreased to less than 0.1 weight percent if the oxidation potential of the slag is decreased to $10^{-11}$ atmospheres (5 percent $Fe_3O_4$ - iron saturation) with a reasonably high grade of matte, that is 50% (Cu + Ni). Moreover, there is mechanical entrainment of matte droplets in the slag which adds to the nickel or copper content of the slag. The high rates of mechanical stirring which are essential for rapid reduction of the iron oxides by coal or coke generate fine dispersions of matte in slags, and in a commercial process, it is essential that this matte be separated from the slag efficiently and rapidly.

Since the direct reduction of converter slags separates nickel and copper as a high matte grade product (nominally greater than 30 percent nickel and copper), it is necessary to provide a pyrite or sulfide concentrate "wash" to reduce the nickel and copper to 0.2 weight percent or less. Thus, pyrite, or copper concentrates, or copper-nickel concentrates may be added to reactor 16 through conveyor 30 (see FIG. 3). As is shown in FIG. 3, the matte may be withdrawn from each reactor as is shown by arrows 11, 13 and 15. Depending upon the silica content of the slag, a sulfide wash producing a matte grade less than 0.1 weight percent nickel and copper can decrease the nickel and copper in the slag (soluble and entrained) to less than 0.2 weight percent. In short, a pyrite or copper concentrate or nickel-copper concentrate wash is essential to achieve acceptable slags containing less than 0.2 weight percent nickel and copper.

Since the carbonaceous materials are of lower density (1 to 2 gm/cc) than molten slag (ca 3 gms/cc), the former floats on the surface of the slag and chemical reactions between the two materials is slow. In addition, when iron oxide reacts with carbon at the high temperatures of molten slag, a gaseous product (CO or $CO_2$) is formed which tends to decrease the contact between the carbon and the slag. Furthermore, molten slag does not normally "wet" carbonaceous materials and there is poor contact. Thus, for conducting chemical reduction in this system, it is important that the stirrer "pump" the carbon solids from the surface, down into the molten slag. In principle, this is blending solids into a liquid. This is effectively done by creating a vortex such that the "light" solids are brought into contact with the stirrer blades and "thrown" radially into the molten material. The stirrer may have a large blade relative to the containment vessel, or a small one. In the former case, a slow speed is needed to achieve the desired conditions, and in the latter, a higher speed or rotation is required. The stirrer may be centered in the vessel, or brought in on an angle.

A key disadvantage to the mechanical stirrer is that the solid carbon, which when submerged into the molten slag floats back to the surface, can be pumped back through the melt a number of times until it is efficiently consumed in the chemical reactions. Until the present invention, no device was known which could accomplish such pumping.

In the case of extraction metal values (such as copper, nickel and cobalt) from molten slag into a molten sulfide matte, it is important to promote interfacial contact between the two immiscible phases (slag and matte or metal). The mechanical stirrer is thus designed to disperse the matte or metal phase into the slag. A vortex at the surface is not required.

The agitator may be axially located in the furnace, or enter from the side, or at an angle; however, the location of the stirrer blades depends on the geometry of the slag and matte phases. Typically, the blade assembly diameter is one-third of the reactor diameter, or less, and the blades are immersed two-thirds of the slag depth. As the blade size diminishes, the speed must be increased to provide sufficient energy to promote interfacial contact.

From the foregoing, it should be clear to those skilled in this art that a high magnetic slag can be efficiently processed to produce a high percentage nickel or nickel-copper product by mixing a reductant into the slag with a mechanical stirrer which physically beats or blends the reductant into the molten slag. Thus, the broadest aspect of the invention is to extract nickel and nickel-copper from the slag by mixing a reductant into it to reduce the magnetite content of the slag and to reduce the nickel oxide and copper oxide in the slag. With the foregoing reduction, nickel or nickel-copper will settle to the bottom of the reactor and may be extracted as a high grade nickel or nickel-copper product or phase. It is not essential to utilize a sulfide to extract nickel or nickel-copper or form a matte in accordance with the present invention; however, utilizing a sulfide extractant and resulting matte is advantageous.

With regard to the flow of slag and product phases and the number of furnace reactors, many options are possible in accordance with the present invention. For example, with a single stage reactor, the slag may be reduced by mixing a carbon containing reductant into it and a nickel or nickel-copper product phase can be extracted from the bottom of the reactor. A sulfide extractant and matte may be advantageously employed in the single stage reactor in addition to the carbon containing extractant. In this embodiment of the invention, iron pyrites can be added to the reactor along with the carbonaceous reductant. The foregoing will result in the formation of a nickel or nickel-copper containing sulfide matte which may be drawn off from the bottom of the single stage reactor.

The following non-limiting example illustrates the embodiment of the present invention wherein slag from a conventional nickel concentrate smelter is treated in a multi-stage reactor in accordance with the present invention. As is shown in FIG. 1, 100 tons of a concentrate which is obtained from a concentrator is roasted and smelted with a silica flux in accordance with well known techniques. The slag from the roasting and smelting circuit is discarded. The matte is delivered to a converter where it is oxidized with air to yield a high grade matte which is treated in accordance with well known techniques.

In accordance with the present invention, the converter slag from the converter is delivered to a multi-stage reactor as is shown in FIG. 2. The slag flows through reactor 12, 14 and 16 in series. While being treated in reactors 12, 14 and 16 the slag is continuously mixed by stirrer 22 (250 rpm) and the slag is maintained at a temperature of 1250° C. During the flow through these reactors, magnetite in the slag is reduced and the soluble copper $Cu_2O$ and nickel NiO is extracted as copper sulfide and nickel sulfide along with entrained metals. During the reaction, sulfides and coal are added to reactors 12, 14 and 16 through feed bin 26. Sulfides are also added through bin 30. The slag is drawn off in spout 31.

Figure 4:
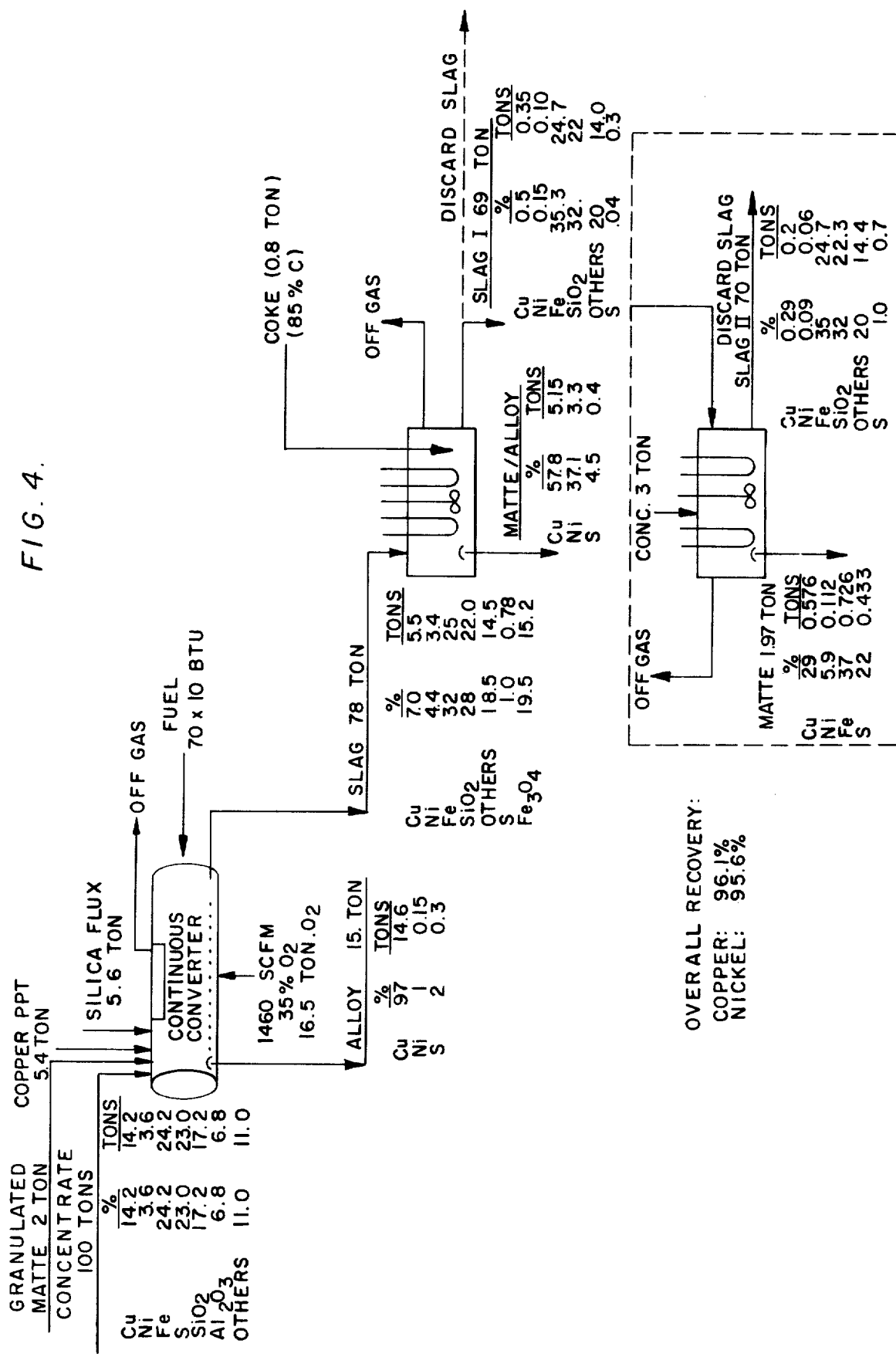
FIG. 4 is a flow sheet showing a slag cleaning process in accordance with the present invention for treatment of copper-nickel sulfide concentrates; and, FIG. 5 is a flow sheet showing a smelting process with stirred electric slag cleaning for treatment of smelter slags.

An alternate embodiment of the invention for smelting of copper-nickel concentrate is shown in FIG. 4. Referring to FIG. 4, concentrates which are high in copper and relatively low in nickel (Example: 8-15 percent copper and 1-5 percent nickel) can be smelted to produce crude copper (95-97 percent copper and 1-2 percent nickel) and a high-grade matte containing nickel and copper. (There are no existing commercial plants treating this type of concentrate). By the use of the mechanically-stirred electric furnace, it is possible to achieve an overall pyrometallurgical process for this type of concentrate which produces the copper, primarily in an anode form suitable for electrorefining, and a nickel matte which is suitable for hydrometallurgical treatment for the recovery of the nickel and the contained copper values. A typical flow sheet is shown in FIG. 4. It is preferable to smelt this type of concentrate or concentrates having the ratio of Cu to Ni greater than 3 in a Noranda reactor. The concentrates are entirely oxidized by blowing with air or air-oxygen mixtures producing a copper product containing small percentages of nickel and sulfur. The copper product may be tapped and cast into anodes for refining, by a suitable process, to a finished product. It is projected that the slag will contain approximately 7 percent copper, 4 percent nickel, 32 percent iron and 28 percent silica. Because of the oxygen potential of the system, the slag will contain 15 percent or more magnetite.

To generalize, the smelting operation essentially transforms the copper into a metal product and the nickel into a nickel oxide which is contained in a siliceous slag, thereby creating a separation of copper from nickel.

The slag which is high in copper (7 percent) and nickel (4.4 percent) must be treated. The slag may be transferred to the mechanically-stirred furnace in which the slag is reduced in a first reduction stage with coke, using the mechanical mixers to enhance the reduction rates. In the first reduction step, a matte is formed which is calculated to contain 58 percent copper, 37 percent nickel, sulfur and little iron. This matte may be granulated and processed hydrometallurgically to separate and recover individually the copper and nickel values. A cleaned slag will be produced in this operation. It is projected that this slag will contain less than half a percent copper and 0.15 percent nickel. This slag may be either discarded or further treated in a second stage, stirred electric furnace in which case the slag is washed with sulfide concentrates or pyrite. The slag is cleaned further to less than 0.29 percent copper and less than 0.1 percent nickel. The incremental nickel and copper values are recovered as a matte containing 29 percent copper, 6 percent nickel and 37 percent iron. This matte may be treated hydrometallurgically or it may be granulated and returned to the smelting furnace for upgrading. Without the stirred-electric furnace, this flow sheet would not be feasible because the highly oxidized, high nickel slags could not be treated in the conventional pyrometallurgical furnaces.

Figure 5:
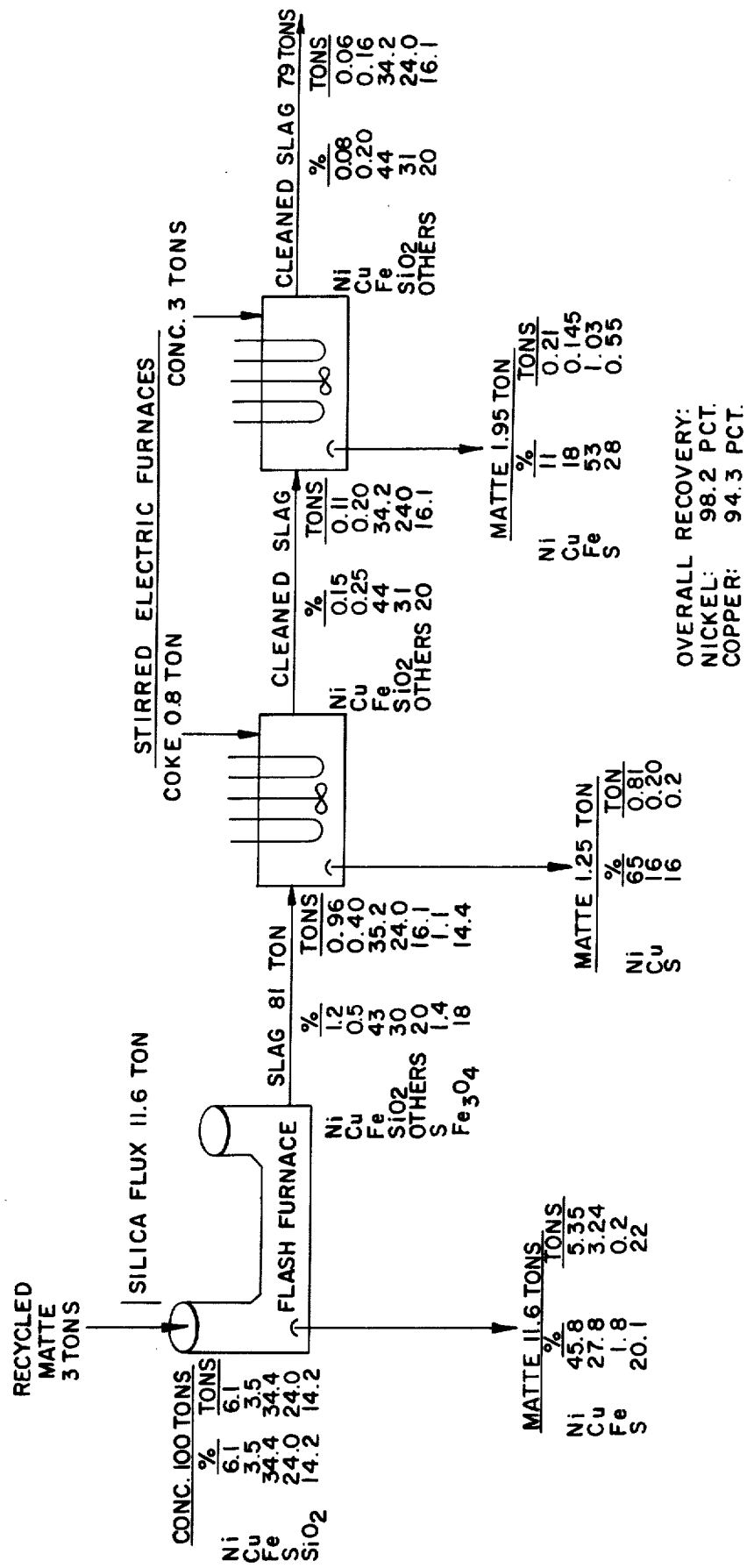

An embodiment of the present invention which is applicable to a flash smelting process is shown in FIG. 5. Referring to FIG. 5 details for optimizing a flash smelting of nickel copper concnetrate using the stirred-electric furnace in accordance with the present invention is shown.

Flash furnaces have been used for the treatment of nickel sulfide concentrates. By simultaneous oxidation and smelting of concentrates, mattes can be produced which contain substantial amounts of iron sulfide. These mattes must be further converted to produce a nickel-copper-sulfide matte which is suitable for further hydro-metallurgical treatment. The slag produced in the conventional flash furnace may be treated in a conventional quiescent submerged arc electric furnace to recover entrained nickel-copper matte.

It is more advantageous to operate the flash furnace under more oxidizing conditions as virtually all of the iron in the smelting furnace is oxidized to FeO in the slag. The resultant product matte is high in nickel and copper values and low in iron and is amenable to direct hydrometallurgial treatment. Under these conditions a highly-oxidized slag is produced which contains significant concentrations of nickel and copper (nominally 1.2 percent nickel and 0.5 percent copper). This slag may be reduced in a stirred-electric furnace to remove the copper and nickel values as a high-grade matte. The reduced slag should contain less than 0.15 percent nickel and 0.25 percent copper. The slag may be treated in the second stirred-electric furnace to recover incremental copper-nickel values.

This flow sheet, which employs the stirred-electric furnace cleaning route with flash furnaces, has the advantages of providing more throughput with a flash furnace than in the conventional route of omitting a converting step for the matte and for achieving higher overall metals recovery.

At this point, the significance of the processes shown in FIG. 2, 4 and 5 is again emphasized. In a typical prior art process, such as the one shown in FIG. 1, the slag from the converter is returned to the smelter. In the process shown in FIG. 2, the significant departure is that the slag from the converter is passed to a separate stage where it is reduced to produce a high grade matte. It should be noted that no slag from the converter or anywhere else is sent to the smelter.

In the process shown in FIG. 4, the smelter and converter are combined in a single stage. This combination is possible only because the slag is processed separately. It should be noted that the slag from the continuous converter is high in both copper and nickel. However, since it is possible to treat this slag in accordance with the present invention, this procedure has economic viability.

The process shown in FIG. 5, is similar to the process shown in FIG. 4. However, since the concentrate is somewhat different, the products are different. In this regard, in the process shown in FIG. 5, a high grade matte is produced whereas in the process shown in FIG. 4, crude copper is produced.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A process for extracting nickel values from a nickel bearing slag comprising the steps of:
 a. introducing the slag into a reactor;
 b. maintaining the temperature of the slag in the reactor at a level at which the slag is molten;
 c. adding a solid reductant to the slag in the reactor, the amount of reductant being sufficient to lower the oxygen potential of the slag to a level at which a nickel bearing phase separates from the slag;
 d. mixing the reductant into the slag in the reactor, while the slag is molten, with a liquid cooled, metal bladed, mechanical, rotating stirrer to reduce the slag, said stirrer being rotated at a speed sufficient to pump said reductant into the slag and keep it submerged in the slag long enough for it to decrease the oxygen potential and lower the soluble nickel content of the slag to enable the formation of a nickel bearing phase; and,
 e. separating a nickel bearing phase from the slag.

13

2. The process as set forth in claim 1 wherein in step (d) a member selected from the group consisting of coke and coal is added to the slag.

3. The process as set forth in claim 1 also including the step of contacting the slag with a sulfide extractant to extract nickel and copper values remaining in the slag after it has been reduced in step (d).

4. The process as set forth in claim 3 wherein the nickel bearing phase is separated from the slag in a sulfide matte.

5. The process as set forth in claim 1 wherein the temperature of the slag during the mixing which takes place in step (d) is maintained between the range of 1200° C - 1250° C.

6. A process for extracting nickel values from a nickel bearing slag comprising the steps of:
 a. introducing the slag to be treated into a multistage reactor containing at least two stages and being of the type in which each stage is connected in series so that slag in one stage can flow into another stage;
 b. maintaining the temperature of the slag in the reactor at a level at which the slag is molten;
 c. adding a reductant to the slag in at least one stage of the reactor, the amount of reductant being sufficient to lower the oxygen potential of the slag to a level at which a nickel bearing phase separates from the slag;
 d. mixing the reductant into the slag in at least one stage of the reactor, while the slag is molten, with a liquid cooled, metal bladed, mechanical, rotating stirrer to reduce the slag, said stirrer being rotated at a speed sufficient to pump said reductant into the slag and keep it submerged in the slag long enough for it to decrease the oxygen potential and lower the soluble nickel content of the slag to enable the formation of a nickel bearing phase; and,
 e. separating the nickel bearing phase from the slag.

7. The process as set forth in claim 6 wherein in step (d) a member selected from the group consisting of coke and coal is added to the slag.

8. The process as set forth in claim 6 also including the step of contacting the slag with a sulfide extractant to extract copper or nickel metal values remaining in the slag after it has been reduced in step (d).

9. The process as set forth in claim 8 wherein the metal phase is separated frm the slag in a sulfide matte.

10. The process as set forth in claim 6 wherein the temperature of the slag during the mixing which takes place in step (d) is maintained between the range of 1200° C - 1250° C.

11. The process as set forth in claim 6 wherein the slag is introduced into a multistage reactor which is connected in series so that the nickel bearing phase which is formed in one stage can flow into another stage separately from the flow of slag from one stage to another and wherein the slag is flowed from stage to stage separately from the flow of the nickel bearing phase.

12. The process as set forth in claim 11 wherein the nickel bearing phase and slag is flowed from one stage to another in a countercurrent manner.

13. The process as set forth in claim 12 wherein prior to removing the slag from the last stage into which the slag is flowed, the slag is washed with a sulfide to extract nickel and copper values remaining in the slag after it has been reduced in step (d) and to form a copper and nickel containing sulfide matte.

14. A process for smelting a concentrate containing metal values selected from the group consisting of nickel, nickel-copper, nickel-cobalt, and nickel-copper-cobalt comprising the following steps:
 a. smelting the concentrate in a smelter to produce a matte containing the values to be recovered and a smelter slag;
 b. delivering the matte produced in step (a) to a converter in which air is added to remove iron and sulfur from the matte and produce a matte phase which is high in metal values and a converter slag;
 c. delivering the converter slag from said converter to a reduction stage;
 d. adding a solid reductant to the slag in the reduction stage, the amount of reductant being sufficient to lower the oxygen potential of the slag to a level at which a metal bearing phase separates from the slag;
 e. mixing the reductant into the slag in the reduction stage while the slag is molten with a liquid cooled, metal bladed, mechanical, rotating stirrer to reduce the slag, said stirrer being rotated at a speed sufficient to pump said reductant into the slag and keep it submerged in the slag long enough for it to decrease the oxygen potential and lower the soluble metal contents of the slag to enable the formation of a metal bearing phase; and,
 f. separating the metal bearing phase from the slag, the treatment of the slag in the reduction stage enabling the concentrate to be efficiently processed without returning the converter slag back to the smelter.

15. A process for treating sulfide concentrates which have a ratio of copper to nickel greater than 3 to produce a crude copper product containing 95-97 percent copper and 1-2 percent nickel and a high grade matte containing copper and nickel comprising the following steps:
 a. introducing the concentrate into a continuous converter in which the concentrate is burnt and melted;
 b. withdrawing an alloy from the continuous converter, said alloy being composed of 95-97 percent copper, and 1-2 percent nickel;
 c. delivering the converter slag from the continuous converter to a first reduction stage;
 d. adding a solid reductant to the slag in the first reduction stage, the amount of reductant being sufficient to lower the oxygen potential of the slag to a level at which a metal bearing phase separates from the slag;
 e. mixing the reductant into the slag in the first reduction stage while the slag is molten with a liquid cooled, metal bladed, mechanical, rotating stirrer to reduce the slag, said stirrer being rotated at a speed sufficient to pump said reductant into the slag and keep it submerged in the slag long enough for it to decrease the oxygen potential and lower the soluble nickel contents of the slag to enable the formation of a nickel bearing phase; and,
 f. separating the nickel bearing phase from the slag.

16. The process as set forth in claim 15 wherein slag from the first reduction stage is treated in a second reduction stage by mixing a sulfide into the slag while the slag is molten with a liquid cooled, metal bladed, mechanical, rotating stirrer to extract nickel and copper values remaining in the slag after the treatment in the first reduction stage into a copper and nickel containing matte.

17. A flash furnace process for treating copper-nickel concentrates comprising the following steps:

a. introducing the concentrate into a flash furnace and reacting the concentrate in the flash furnace to produce a matte and a slag;
b. delivering the slag from said flash furnace to a reduction stage;
c. adding a solid reductant to the slag in the reduction stage, the amount of reductant being sufficient to lower the oxygen potential of the slag to a level at which a metal bearing phase separates from the slag;
d. mixing the reductant into the slag in the reduction stage while the slag is molten with a liquid cooled, metal bladed, mechanical, rotating sitrrer to reduce the slag, said stirrer being rotated at a speed sufficient to pump said reductant into the slag and keep it submerged in the slag long enough for it to decrease the oxygen potential and lower the soluble copper-nickel contents of the slag to enable the formation of a copper-nickel bearing phase; and,
e. separating the copper-nickel bearing phase from the slag.

* * * * *